(12) United States Patent
Xu et al.

(10) Patent No.: US 11,706,508 B2
(45) Date of Patent: Jul. 18, 2023

(54) LIGHT LAMP ASSEMBLY FOR MULTI-SENSOR CAMERA

(71) Applicant: HANGZHOU HIKVISION DIGITAL TECHNOLOGY CO., LTD., Hangzhou (CN)

(72) Inventors: Peng Xu, Hangzhou (CN); Zhan Ye, Hangzhou (CN); Caisheng Yan, Hangzhou (CN); Hongjie Guan, Hangzhou (CN); Yang Li, Hangzhou (CN); Yufei Ma, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 219 days.

(21) Appl. No.: 17/285,784

(22) PCT Filed: Jan. 15, 2020

(86) PCT No.: PCT/CN2020/072236
§ 371 (c)(1),
(2) Date: Apr. 15, 2021

(87) PCT Pub. No.: WO2020/147744
PCT Pub. Date: Jul. 23, 2020

(65) Prior Publication Data
US 2022/0006925 A1      Jan. 6, 2022

(30) Foreign Application Priority Data

Jan. 17, 2019   (CN) .......................... 201910044423.6
Jun. 20, 2019   (CN) .......................... 201910536036.4

(51) Int. Cl.
*H04N 5/335*   (2011.01)
*H04N 23/51*   (2023.01)
(Continued)

(52) U.S. Cl.
CPC ............. *H04N 23/51* (2023.01); *H04N 23/55* (2023.01); *H04N 23/56* (2023.01); *G03B 5/02* (2013.01);
(Continued)

(58) Field of Classification Search
CPC .................................................... H04N 5/2254
See application file for complete search history.

(56) References Cited

U.S. PATENT DOCUMENTS 10,142,542 B2 * 11/2018 Bracy ................. H04N 23/698
2009/0167861 A1 * 7/2009 Gal .......................... B63G 8/14
                                                        348/143

(Continued)

FOREIGN PATENT DOCUMENTS

CN      101527828 A      9/2009
CN      201562109 U      8/2010
(Continued)

OTHER PUBLICATIONS

Extended European Search Report dated Nov. 24, 2021 in corresponding EP Application No. 20741245.3.
International Search Report issued in PCT/CN2020/072236, dated Apr. 21, 2020, 8 pages.

*Primary Examiner* — Gary C Vieaux
(74) *Attorney, Agent, or Firm* — Meunier Carlin & Curfman LLC

(57) ABSTRACT

The embodiments of the present application relates to a camera, comprising a first housing, a stitching lens mechanism, and a driving assembly. The stitching lens mechanism is mounted in the first housing, and the stitching lens mechanism comprises at least two first assemblies, the first lens assembly comprises a first lens, a first included angle is formed between at least two first lenses. A driving assembly is connected to the first lens assembly through a rotating assembly. At least two first lenses are distributed in a first (Continued)

plane, the first housing is rotatably arranged in a second plane, and the second plane is perpendicular to the first plane. Each of the first lens assemblies takes pictures in different orientations for the same scene, so that the imaging field of view is larger. So that the first housing can rotate under the drive of the driving assembly, that is, the stitching lens mechanism can rotate. Compared with the existing stitching camera with a fixed structure, the imaging field of view of the camera of the present application is larger. That is, the camera of the present application can further expand the range of the imaging field of view compared to the existing camera.

9 Claims, 12 Drawing Sheets

(51) Int. Cl.
*H04N 23/55* (2023.01)
*H04N 23/56* (2023.01)
*G03B 5/02* (2021.01)
*H04N 23/52* (2023.01)

(52) U.S. Cl.
CPC ...... *G03B 2205/0053* (2013.01); *H04N 23/52* (2023.01)

(56) References Cited

U.S. PATENT DOCUMENTS

| | | |
|---|---|---|
| 2011/0164133 A1* | 7/2011 | Chang .................. H04N 23/45 348/143 |
| 2015/0288860 A1 | 10/2015 | Chu et al. |
| 2016/0259979 A1 | 9/2016 | Aguilar et al. |
| 2016/0277686 A1 | 9/2016 | Lee |
| 2018/0063507 A1 | 3/2018 | Lieu et al. |

FOREIGN PATENT DOCUMENTS

| | | | |
|---|---|---|---|
| CN | 101833231 | A | 9/2010 |
| CN | 103618881 | A | 3/2014 |
| CN | 203896422 | | 10/2014 |
| CN | 104519322 | A | 4/2015 |
| CN | 204316671 | U | 5/2015 |
| CN | 205071148 | U | 3/2016 |
| CN | 205793059 | | 12/2016 |
| CN | 106791656 | A | 5/2017 |
| CN | 106878597 | A | 6/2017 |
| CN | 106895304 | | 6/2017 |
| CN | 107509055 | A | 12/2017 |
| CN | 108833746 | A | 11/2018 |
| CN | 208094669 | U | 11/2018 |
| CN | 111698495 | A * | 9/2020 |
| WO | 2006093387 | A1 | 9/2006 |
| WO | WO-2021223445 | A1 * | 11/2021 |

* cited by examiner

LIGHT LAMP ASSEMBLY FOR MULTI-SENSOR CAMERA

The present application claims the priority to a Chinese patent application No. 201910044423.6 filed on Jan. 17, 2019 entitled "camera" and a Chinese patent application No. 201910536036.4 filed on Jun. 20, 2019 entitled "fill light module and camera" with the China National Intellectual Property Administration, which are incorporated herein by reference in its entirety.

TECHNICAL FIELD

The application relates to the field of camera technology, in particular to a camera.

BACKGROUND

A full-color camera can clearly display a color image even in starlight environment without the assistance of white light lamp, while ordinary camera can only image with the assistance of light source.

A stitching camera includes multiple lenses, and each lens is provided with one sensor or multiple sensors. The stitching camera can collect images of a wide range of scenes. Specifically, multiple sensors in the camera collect images in different orientations for the same scene, and send the collected images to a programmable logic device in the camera. The programmable logic device receives multi-channel images, and stitches the multi-channel images, and sends the stitched images to a chip-level system. The chip-level system processes the stitched images and outputs the processed images, so that the images of a wide range of scenes can be obtained.

Existing cameras still have the problem of small field of view.

SUMMARY

The purpose of the embodiments of the present application is to provide a camera capable of expanding the imaging field of view. Specifically, the technical solutions are as follows.

In a first aspect, an embodiment of the present application provides a camera, wherein, the camera includes:

a first housing;

a stitching lens mechanism, which is mounted in the first housing, and includes at least two first lens assemblies, wherein a first lens assembly includes first lenses, and a first angle is formed between at least two first lenses;

a driving assembly, which is connected to the first lens assembly through a rotating assembly.

Preferably, the first housing has a mounting cavity, the at least two first lens assemblies are mounted in the mounting cavity, and the driving assembly is connected to the first housing through the rotating assembly.

Preferably, there is an overlapping included angle between imaging fields of view of the two adjacent first lenses, the imaging fields of view of two adjacent first lenses are combined into a total field of view, an included angle of the total field of view is a total included angle, and the overlapping included angle is between 10% and 15% of the total included angle.

Preferably, the at least two first lenses are distributed in a first plane, the first housing is rotatably arranged in a second plane, and the second plane is perpendicular to the first plane.

Preferably, the camera further includes a first fill light lamp assembly, the first fill light lamp assembly includes at least two first fill light lamps, and a second included angle is formed between the at least two first fill light lamps; the light of the first fill light lamp assembly is directed toward the imaging field of view of the stitching lens mechanism.

Preferably, the first lens assembly is a full-color lens assembly.

Preferably, the camera further includes a second housing, a second lens assembly is mounted in the second housing, and the second lens assembly includes a second lens; the second lens and the first lenses face the same side; the second lens is a fixed focus lens, the first lenses are zoom lenses.

Preferably, one end of the second housing where the second lens is mounted is a mounting end, and the mounting end of the second housing is also provided with a mounting space, the first housing is mounted on the mounting space.

Preferably, two symmetrical mounting blocks are arranged on the second housing, and the first housing is arranged between the two mounting blocks and is rotatably connected to the mounting blocks through a rotating shaft.

Preferably, the number of the first lens assemblies is two.

Preferably, the number of the fill light lamps is two.

Preferably, the two first fill light lamps are located within the included angle of the two first lenses, and the included angle between the two first fill light lamps is greater than that between the two first lenses.

Preferably, the first housing is provided with two symmetrical mounting bevels, each mounting bevel is provided with a first window and a first fill light lamp, the first window is opposite to the first lens.

Preferably, the first housing includes a rear housing and a first cover, and the first cover is connected to the rear housing in a snap-connection manner.

Preferably, the first cover is provided with two first windows, which are spaced apart, a first transparent piece is mounted on a first window, and is opposite to a first lens.

Preferably, the first cover is provided with two lamp body mounting ports, the two lamp body mounting ports are located between the two first windows, and the first fill light lamps are connected to the lamp body mounting ports in a snap-connection manner.

In a second aspect, an embodiment of the present application provides a fill light lamp module, including a lamp body assembly and a sealing body; the lamp body assembly includes a enclosure and a lamp body, the sealing body is provided with a through hole; the sealing body is connected to the enclosure, and the sealing body and the enclosure enclose a lamp cavity; the lamp body is arranged in the lamp cavity, and the lamp body faces the through hole; the sealing body is used for abutting against an inner peripheral wall of a lamp port of a camera.

Preferably, the sealing body is an integrally formed member.

Preferably, the sealing body is an elastic member.

Preferably, the sealing body is sleeved by and fitted with the enclosure.

Preferably, a light distribution element is provided between the lamp body and the through hole, and the light distribution element blocks the through hole.

In a third aspect, an embodiment of the present application provides a camera, including a first housing, a first lens assembly, and the above-mentioned fill light lamp module; the first housing has a first mounting cavity, and the first housing is provided with a first lamp port; the first lens assembly and the fill light lamp module are arranged in the first mounting cavity, and a part of the sealing body is sandwiched between an inner peripheral wall of the first lamp port and the lamp body assembly, and the through hole is arranged opposite to the first lamp port.

Preferably, the sealing body is provided with a protrusion, and the protrusion is press-fitted with the inner peripheral wall of the first lamp port.

Preferably, the enclosure includes a first connecting portion, the first housing includes a second connecting portion, the first connecting portion is connected to the second connecting portion by a connecting piece, the first connecting portion and the second connecting portion are arranged in parallel.

Preferably, the first lens assembly is a stitching lens assembly, the first lens assembly includes at least two first lenses, and an included angle formed between axes of two adjacent first lenses ranges from 50° to 90°.

Preferably, the first lens assembly is a stitching lens assembly, the first lens assembly includes at least two first lenses, an included angle is formed between axes of two adjacent first lenses, and a combined viewing angle of the two first lenses ranges from 150° to 190°.

Preferably, the fill light lamp module is arranged between two adjacent first lenses.

Preferably, the number of the fill light lamp module is at least two, and an angle is formed between two adjacent fill light lamp modules, and an optical axis of the fill light lamp module and axes of the first lenses are distributed on a same plane.

Preferably, the camera further includes a second housing, and the first housing is rotatably connected to the second housing.

Preferably, there is an included angle between a distribution plane of the first lenses and a rotation plane of the first housing.

Preferably, the camera further includes a second lens assembly, the second housing has a second mounting cavity, and the second lens assembly is arranged in the second mounting cavity.

Preferably, the first housing is driven to rotate by a power device, the first housing has a third mounting cavity, the power device is arranged in the third mounting cavity, the first mounting cavity and the third mounting cavity are sealed cavities.

In a fourth aspect, an embodiment of the present application provides a camera, including a first housing, a first lens assembly provided in the first housing, and two above-mentioned fill light lamp modules provided in the first housing; the first lens assembly includes two first lenses, an included angle is formed between axes of the two first lenses; the fill light lamp modules are arranged between the two first lenses, an included angle is formed between optical axes of the two fill light lamp modules; the first housing is provided with two first windows and two first lamp ports, and the first lenses face the first windows, the lamp bodies face the first lamp ports; the first windows and the first lamp ports are distributed on different planes.

In a fifth aspect, an embodiment of the present application provides a camera, including a first housing, two first lens assemblies, a second housing, a second lens assembly, and four fill light lamp assemblies;

the two first lens assemblies are mounted in the first housing, wherein a first lens assembly includes first lenses, and the first housing is provided with two first windows and two first lamp ports, the first windows are opposite to the first lenses, the first lenses are used to collect images through the first windows, and centers of the first windows and the first lamp ports are set at a same vertical height;

the second lens assembly is mounted in the second housing, the second lens assembly includes a second lens, and the second housing is provided with two second windows and two second lamp ports, the second lens is used to collect images through the second windows, and centers of the second windows and the second lamp ports are set at a same vertical height;

the first housing is detachably connected to the second housing;

the four fill light lamp assemblies are respectively fixed to the two first lamp ports and the two second lamp ports, and are used to fill light to the first lens assemblies and the second lens assembly;

wherein, the first housing is a component with a curved surface, including a first curved component and a second curved component; the first windows are arranged on the first curved component, and the first lamp ports are arranged on the second curved component, the first curved component and the second curved component are not coplanar.

Preferably, a first included angle is formed between axes of the two first lenses, and the first included angle ranges from 50° to 90°.

Preferably, there is an overlapping included angle between imaging fields of view of the two first lenses, and the imaging fields of view of the two first lenses are combined into a total field of view, and an included angle of the total field of view is a total included angle, the total included angle ranges from 150° to 190°, and the overlapping included angle is between 10% and 15% of the total included angle.

Preferably, the second lens and the first lenses face the same side; the second lens is a fixed focus lens, and the first lenses are zoom lenses.

Preferably, the camera further includes a driving assembly, which is connected to the first lens assemblies through a rotating assembly;

the first housing has a first mounting cavity, the at least two first lens assemblies are mounted in the first mounting cavity, and the driving assembly is connected to the first housing through the rotating assembly.

Preferably, the second housing has a second mounting cavity, and the second lens assembly is mounted in the second mounting cavity.

Preferably, the two first lenses are distributed in a first plane, the first housing is rotatably arranged in a second plane, and the second plane is perpendicular to the first plane.

Preferably, one end of the second housing where the second lens assembly is mounted is a mounting end, and the mounting end of the second housing is also provided with a mounting space, and the first housing is mounted on the mounting space.

Preferably, two symmetrical mounting blocks are arranged on the second housing, and the first housing is arranged between the two mounting blocks and is rotatably connected to the mounting blocks through a rotating shaft.

Preferably, the first housing is driven to rotate by a power device, the first housing has a third mounting cavity, the power device is arranged in the third mounting cavity.

Preferably, a fill light lamp assembly includes a lamp body assembly and a sealing body; the lamp body assembly includes an enclosure and a lamp body, the sealing body is provided with a through hole; the sealing body is connected to the enclosure, and the sealing body and the enclosure enclose a lamp cavity; the lamp body is arranged in the lamp cavity, and the lamp body faces the through hole; the sealing body is used for abutting against an inner peripheral wall of a lamp port of the camera.

Preferably, the sealing body is an integrally formed member.

Preferably, the sealing body is an elastic member.

Preferably, the sealing body is sleeved by and fitted with the enclosure.

Preferably, a light distribution element is provided between the lamp body and the through hole, and the light distribution element blocks the through hole.

Preferably, the sealing body of the fill light lamp assembly is sandwiched between an inner peripheral wall of the first lamp port and the lamp body assembly of the fill light lamp assembly, and a through hole of the fill light lamp assembly is arranged opposite to the first lamp port;

the sealing body of the fill light lamp assembly is sandwiched between an inner peripheral wall of the second lamp port and the lamp body assembly of the fill light lamp assembly, and the through hole of the fill light lamp assembly is arranged opposite to the second lamp port.

Preferably, the sealing body of the fill light lamp assembly is provided with a protrusion that is press-fitted with the inner peripheral wall of the first lamp port;

the sealing body of the fill light lamp assembly is provided with a protrusion that is press-fitted with the inner peripheral wall of the second lamp port.

Preferably, an enclosure of the fill light assembly includes a first connecting portion, the first housing includes a second connecting portion, the first connecting portion is connected to the second connecting portion by a connecting piece, the first connecting portion and the second connecting portion are arranged in parallel.

The advantage of the camera of the present application is that at least two first lens assemblies constitute a stitching lens mechanism, and each of the first lens assemblies takes pictures in different orientations for the same scene, so that the imaging field of view of the whole camera is larger than that of the existing non stitching lens camera. The present application enables the rotation of the first lens assembly based on the stitching lens mechanism, including two situations in which a part of the first lens assembly can be rotated and all of the first lens assembly can be rotated. Compared to the existing stitching camera with a fixed lens position, the imaging field of view of each rotatable first lens assembly of the present application is larger than the existing imaging field of view with a fixed single lens position, so that the imaging field of view of the camera of the present application is larger. That is, the camera of the present application can further expand the range of the imaging field of view compared to the existing camera.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

Figure 1:
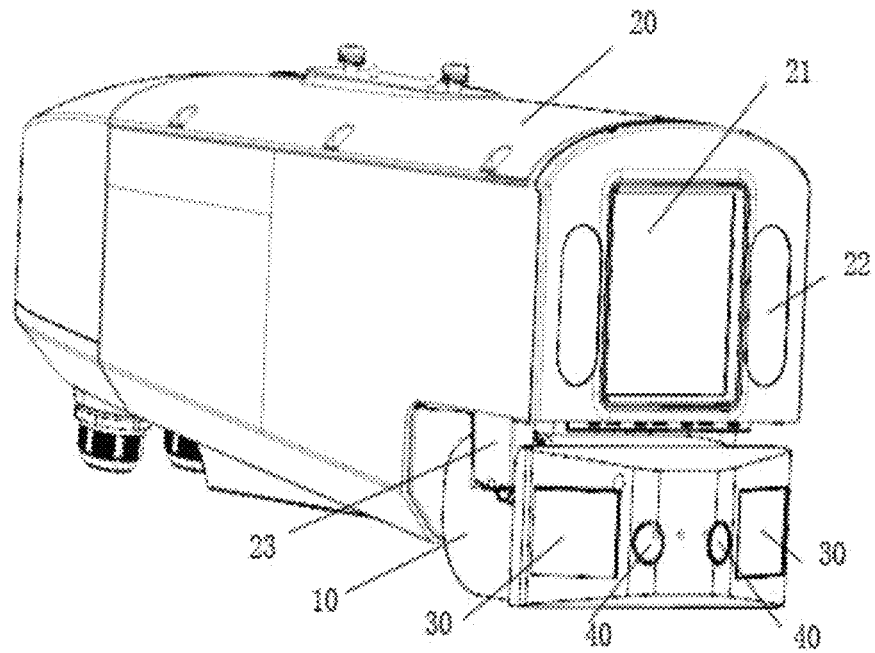
FIG. 1 is an overall schematic structural diagram of a camera according to an embodiment of the present application.

The component names and reference numbers in FIGS. 1-6 are as follows:

first housing 10, rear housing 11, cover plate 111, first cover 12, first window 121, lamp body mounting port 122, mounting bevel 123, second housing 20, second transparent piece 21, second fill light 22, mounting block 23, mounting space 24, first transparent piece 30, first fill light lamp 40, first lens assembly 50, first lens 51, rotating shaft 60, electric motor 70.

The component names and reference numbers in FIGS. 7-20 are as follows:

first housing 10, front housing 101, rear housing 102, first threading hole 1021, first mounting cavity 110, first lamp port 120, the first window 13, second connecting portion 14, motor cavity 161, end cover 162, through hole 1621, motor 163, first rotating shaft 164, second rotating shaft 165, second housing 20, outer cover 212, second lamp port 220, second window 230, first lens assembly 300, first lens 31, fill light lamp module 400, enclosure 41, first connecting portion 412, first connecting hole 4121, lamp plate 42, lamp body 421, light distribution element 43, sealing body 44, sealing portion 441, through hole 4411, protrusion 4412, connecting body 442, first connecting member 45, lamp cavity 46, cable 510, first cable 5101, second cable 5102, partition plate 60, and second threading hole 61.

Figure 16:
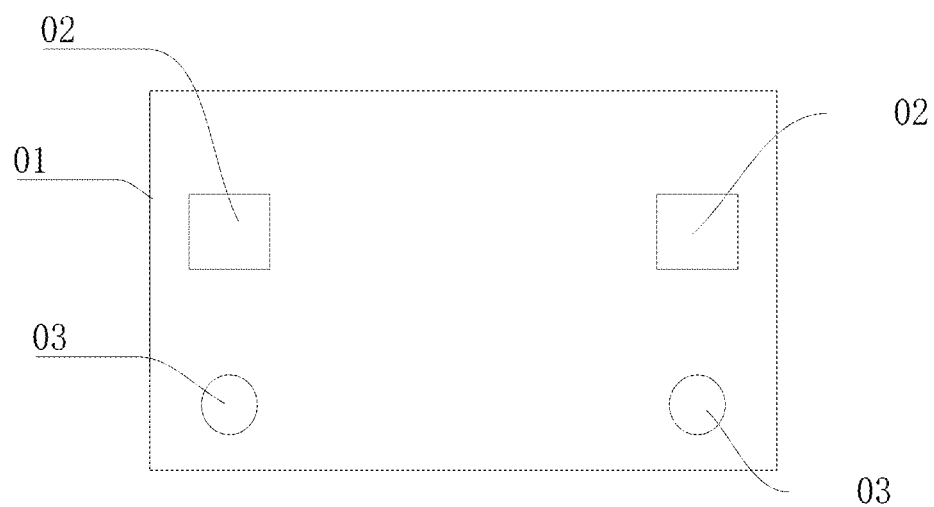
FIG. 16 is an end view of an enclosure of the existing camera.

The component names and reference numbers of the existing camera components in FIG. 16 are as follows: enclosure 01, window 02, fill light lamp port 03.

The above-mentioned rear shell refers to an enclosure located on the rear side of the first housing in the camera product, which may be a rear housing 11 shown in FIGS. 1-6, or a rear housing 102 shown in FIGS. 7-20, or a housing of other shapes. The first lens assembly refers to a lens assembly in the camera product, which is composed of multiple lenses. The first lens assembly may be a first lens assembly 50 shown in FIGS. 1-6 or a first lens assembly 300 shown in FIGS. 7-20, or a lens assembly of other shapes. The first lens is a lens used to compose the first lens assembly. The first lens may be a first lens 51 shown in FIGS. 1-6, or a first lens 31 shown in FIGS. 7-20, or a lens of other shapes.

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

In the embodiment of the present application, the direction in which the camera faces imaging scene is taken as the front direction, and the camera in the embodiment of the present application is described in the up, down, left, and right directions in FIG. 1.

As shown in FIGS. 1-6, the camera of the embodiment of the present application includes a first housing 10, a stitching lens mechanism, and a driving assembly. The stitching lens mechanism is mounted in the first housing 10, and the stitching lens mechanism includes at least two first assemblies 50, wherein a first lens assembly 50 includes first lenses 51, a first included angle is formed between at least two first lenses 51, that is, a first included angle is formed between two adjacent first lenses 51. A driving assembly is connected to the first lens assemblies 50 through a rotating assembly.

The advantage of the camera of the embodiment of the present application is that at least two first lenses assemblies constitute a stitching lens mechanism, and each of the first lens assemblies takes pictures in different orientations for the same scene, so that the imaging field of view of the whole camera is larger than that of the existing non stitching lens camera. The present application enables the rotation of the first lens assemblies 50 based on the stitching lens mechanism, including two situations in which a part of the first lens assemblies 50 can be rotated and all of the first lens assemblies 50 can be rotated. Compared to the existing stitching camera with a fixed lens position, the imaging field of view of each rotatable first lens assembly 50 of the present application is larger than the existing imaging field of view with a fixed single lens position, so that the imaging field of view of the camera of the present application is larger. That is, the camera of the present application can further expand the range of the imaging field of view compared to the existing camera.

The embodiment of the present application includes two schemes. Scheme 1: a part of the first lens assemblies 50 can be rotated, and a part of the first lens assemblies 50 are fixed. Scheme 2: All the first lens assemblies 50 can be rotated. For scheme 1: Each first lens assembly 50 that can be rotated may be respectively connected with a driving assembly and driven to rotate independently by each driving assembly. Or all the first lens assemblies 50 that can be rotated may be rotated at the same time under the driving of the driving assemblies. For scheme 2: Each first lens assembly 50 may be respectively connected with a driving assembly and driven to rotate independently by each driving assembly. Or all the first lens assemblies 50 may be rotated at the same time under the driving of the driving assemblies.

The stitching lens mechanism of the embodiment of the present application includes two schemes for mounting in the first housing 10. Scheme 3: a first housing 10 includes multiple sub-housings, each sub-housing has a mounting cavity, and at least two first lens assemblies 50 are respectively mounted in the mounting cavities of each of sub-housings. Scheme 4: a first housing 10 has a mounting cavity, and at least two first lens assemblies 50 are mounted in the mounting cavity.

Preferably, for scheme 4, the driving assembly of the embodiment of the present application is connected to the first housing 10 through a rotating assembly. The rotating assembly is respectively connected to the driving assembly and the first housing 10. After the driving assembly is started, the first housing 10 can be driven to rotate by the driving assembly, and then all the first lens assemblies 50 can be rotated at the same time. When the driving assembly needs to drive all the first lens assemblies 50 to rotate at the same time, it is more cost-effective to install all the first lens assemblies 50 in a first housing 10, and it can also ensure that all the first lens assemblies 50 can rotate at the same time.

Figure 5:
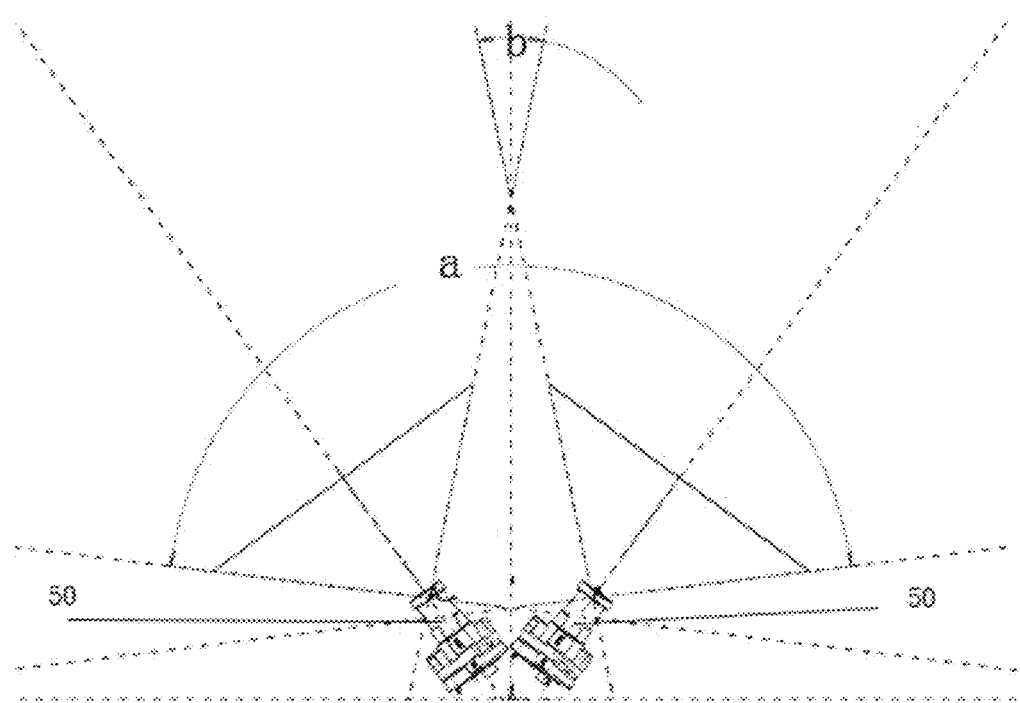
FIG. 5 is a schematic diagram of angles of view of two first lenses of a camera according to an embodiment of the present application.

Preferably, as shown in FIG. 5, there is an overlapping included angle b between imaging fields of view of two adjacent first lenses 51, and the imaging fields of view of the two adjacent first lenses 51 are combined into a total field of view, an included angle of the total field of view is a total included angle a, and the overlapping included angle b is between 10% and 15% of the total included angle. On the basis of ensuring that there is no camera blind area, the range of the total field of view is relatively large.

In addition, compared to a stitching camera that can achieve the same imaging range, the camera of the embodiment of the present application can save the number of the first lens assemblies 50 or the number of sensors in the first lens assemblies 50, thereby reducing the cost.

Figure 2:
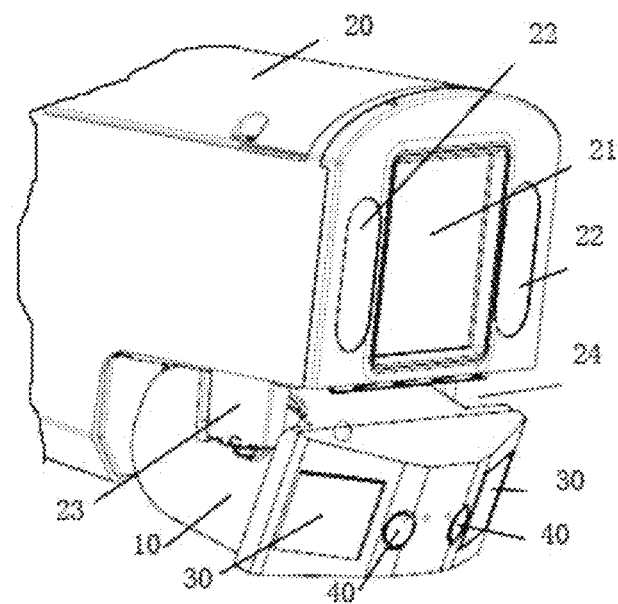
FIG. 2 is a working state diagram of a camera according to an embodiment of the present application.

At least two first lenses 51 may be arranged in the same plane, or may be arranged in different planes. When the at least two first lenses 51 are arranged on the same plane, a rotation plane of the first housing 10 may be the same as or different from a plane where the at least two first lenses 51 are located. No matter they are arranged in the same plane or not, and no matter the rotation plane of the first housing 10 is the same as the plane on which the at least two first lenses 51 are located or not, the camera of the embodiment of the present application can have a larger imaging filed of view than the existing camera. Compared to a stitching camera capable of achieving the same imaging range, the camera of the embodiment of the present application can save the number of the first lens assemblies 50 or the number of sensors in the first lens assemblies 50, thereby reducing the cost. As shown in FIG. 2, preferably, at least two first lenses 51 of the camera of the embodiment of the present application are distributed in a first plane, the first housing 10 is rotatably arranged in a second plane, and the second plane is perpendicular to the first plane. The first plane of the embodiment of the present application is a horizontal plane, and the second plane is a vertical plane. The first lenses 51 of the at least two first lens assemblies 50 are distributed in the first plane, so as to ensure that the camera has a larger imaging field of view in the first plane. The first housing 10 is rotatably arranged in a second plane, and the second plane is perpendicular to the first plane, so as to ensure that the camera has a larger imaging field of view in the second plane, that is, the camera in the embodiment of the present application can have a larger imaging field of view in the two mutually perpendicular first and second planes, so that the imaging range is larger, the imaging is more comprehensive, and the number of the first lens assemblies 50 or the number of sensors in the first lens assemblies can be further saved, thereby reducing the cost.

The first lens assembly 50 may be a non-full-color lens assembly or a full-color lens assembly. Preferably, the first lens assembly 50 in the embodiment of the present application is a full-color lens assembly. The full-color lens assembly can clearly display a color image even in starlight environment without the assistance of white light lamp, the full-color lens assembly combined with the first fill light lamp assembly can achieve better imaging effects. While having a better imaging effect, the camera of the embodiment of the present application also has a larger imaging field of view, that is, the camera of the embodiment of the present application not only has a larger imaging field of view, but also has a better imaging effect.

On the basis that the first lens assembly 50 in the embodiment of the present application is a full-color lens assembly, there may be no need to provide a fill light lamp. Preferably, in order to further improve the imaging effect of the camera of the embodiment of the present application, the camera further includes a first fill light lamp assembly, and the first fill light lamp assembly includes at least two first fill light lamps 40, and a second included angle is formed between at least two first fill light lamps 40, that is, a second included angle is formed between two adjacent first fill light lamps 40. The light of the first fill light lamp assembly faces the imaging field of view of the stitching lens mechanism. The first fill light lamp assembly is used to fill light for the stitching lens mechanism, thereby improving the imaging effect. The light of the first fill light lamp assembly covers the imaging field of view of the stitching lens mechanism. Therefore, it can be ensured that in any imaging field of view, the first fill light lamp assembly can fill light for the stitching lens mechanism.

Since the first lenses 51 of the at least two first lens assemblies 50 are distributed in the first plane, and also since during the rotation of the first housing 10, the first lens assembly 50 and the first fill light lamp assembly rotate synchronously with the first housing 10, in order to achieve a better effect of filling light, at least two first fill light lamps and at least two first lenses 51 are distributed in the same plane, that is, at least two first fill light lamps are also distributed in the same plane.

Figure 3:
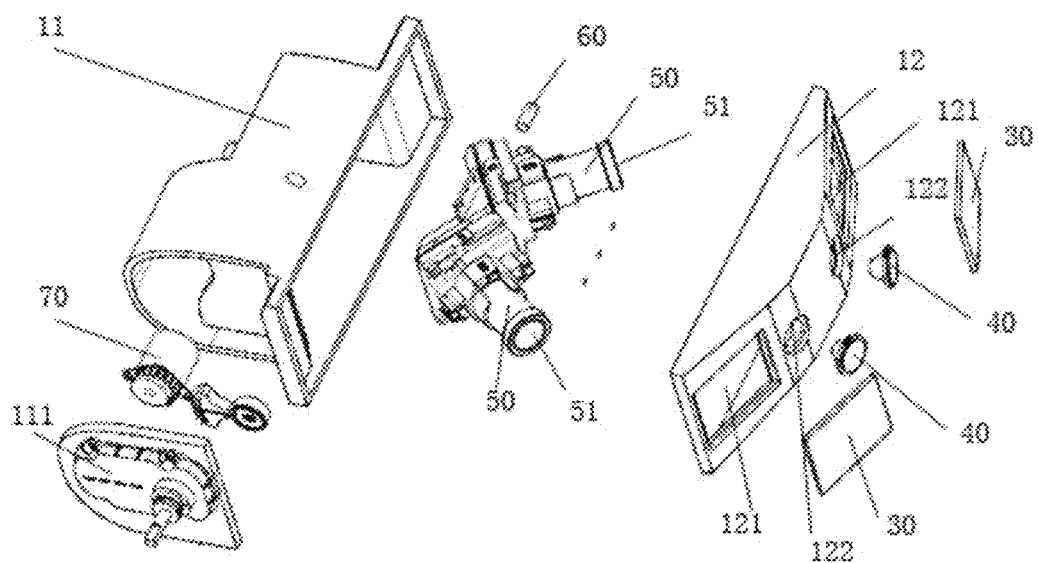
FIG. 3 is a partial exploded diagram of a camera according to an embodiment of the present application.
Figure 4:
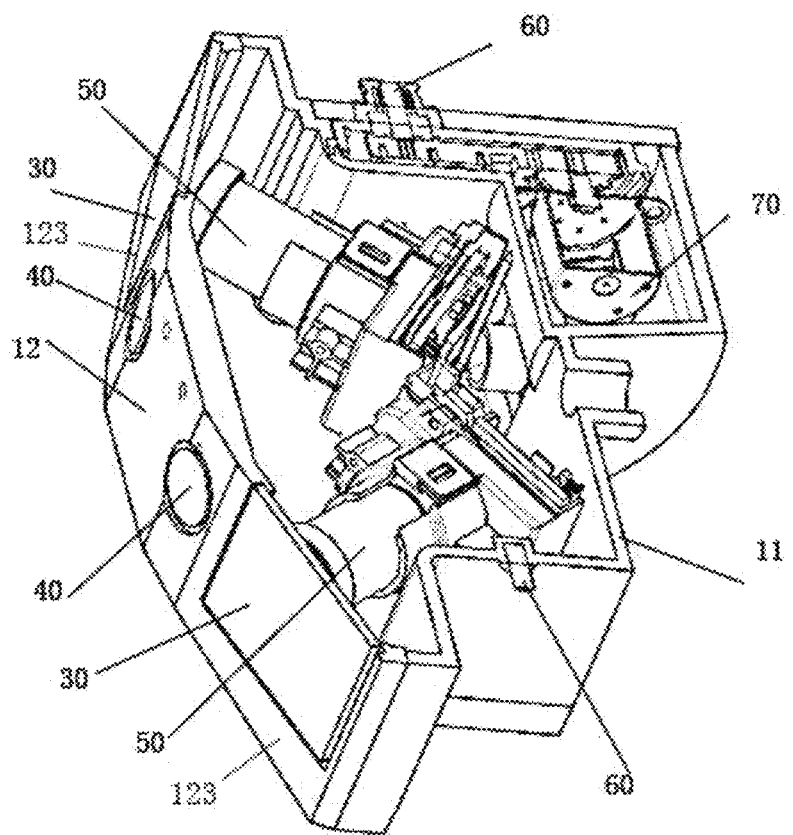
FIG. 4 is a perspective diagram of an internal structure of a first housing of a camera according to an embodiment of the present application.

The number of the first lens assemblies 50 may be two, three, four or even more, and the first lenses 51 of the two, three, four or even more first lens assemblies 50 may be distributed on multiple planes, or may also be distributed on the same plane. As shown in FIG. 3, preferably, the number of the first lens assemblies 50 in the embodiment of the present application is two, and the first lenses 51 of the two first lens assemblies 50 are distributed on the same plane, that is, the first lenses 51 of the two first lens assemblies 50 are distributed on the same plane. Two first lenses 51 are arranged in the first plane, the stitching lens mechanism can have a sufficiently large imaging field of view in the first plane by adjusting the included angle between the two first lenses 51. The advantage of having two first lens assemblies 50 is that the cost is saved on the basis of ensuring a sufficiently large imaging field of view. The two first lenses 51 have respective imaging fields of view, as shown in FIG. 5, there is an included angle between the two first lenses 51, and the imaging fields of view of the two first lenses 51 have overlapping parts, so as to ensure a complete video of imaging scene and obtain a complete picture. One or more sensors may be provided in each of the first lenses 51. Preferably, one sensor is provided in the first lens 51 in the embodiment of the present application. Each of the first lenses collects images in different orientations for the same scene, and sends the collected images to a programmable logic device in the camera. The programmable logic device receives multi-channel images, and stitches the multi-channel images, and sends the stitched images to a chip-level system. The chip-level system processes the stitched images and outputs the processed full-color stitching images.

Figure 6:
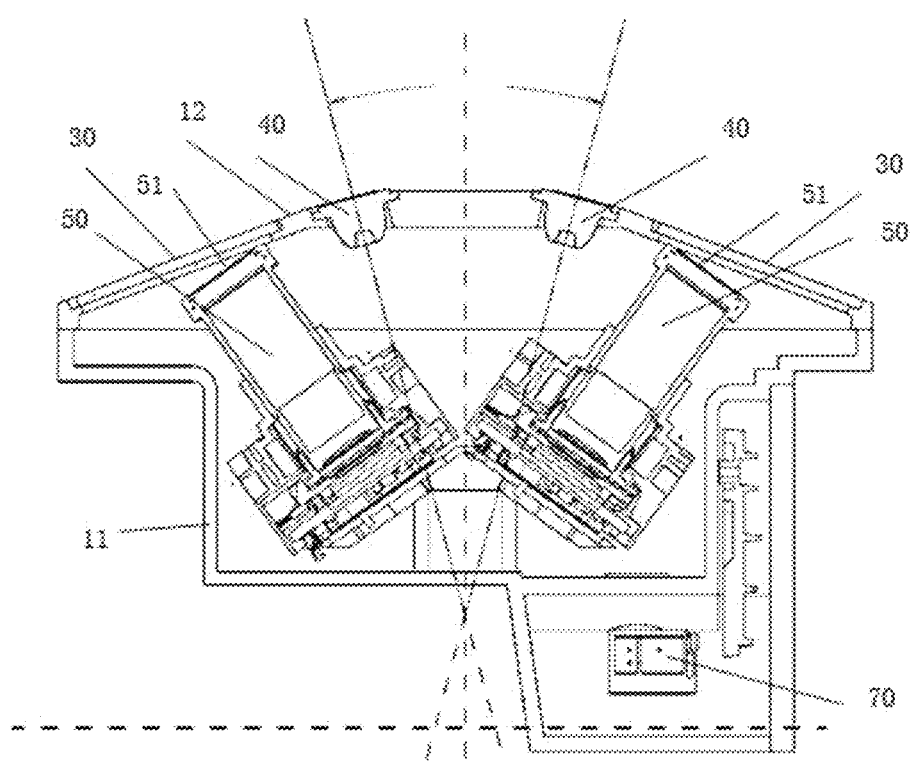
FIG. 6 is a top view of an internal structure of a first housing of a camera according to an embodiment of the present application.

The number of the first fill light lamp assemblies may be two, three, four or even more, and the first fill light lamps 40 of the two, three, four or even more first fill light lamp assemblies 40 may be distributed on multiple planes, or may be distributed on the same plane. As shown in FIG. 6, preferably, the number of the first fill light lamps is two. The two first fill light lamps 40 are distributed in a first plane. The included angle between the two first fill light lamps 40 can be adjusted so that the entire first fill light lamp assembly can cover the imaging field of view of the stitching lens mechanism. The advantage of having two first fill light lamps 40 is that the cost is saved on the basis of ensuring that the light covers the imaging field of view of the stitching lens mechanism.

The first fill light 40 may be mounted on the upper, lower, left, right, and front sides of the first housing 10. In order to realize the function of fully fill light for the stitching lens mechanism with a small number of first fill light lamps 40, as shown in FIG. 6, preferably, the two first fill light lamps 40 of the embodiment of the present application are located on the front side of the first housing 10, the two first fill light lamps 40 of the embodiment of the present application are located within the included angle of the two first lenses 51, and the included angle between the two first fill light lamps 40 is greater than the included angle between the two first lenses 51, that is, the second included angle is greater than the first included angle. The two first fill light lamps 40 are arranged within the included angle of the two first lenses 51, so that the first fill light lamps 40 can fill light for the two first lenses 51 conveniently. In addition, the included angle between the two first fill light lamps 40 is greater than the included angle between the two first lenses 51, so as to ensure that the light of the fill light lamps can cover the imaging field of view of the stitching lens mechanism. Such a structural arrangement enables the use of two first fill light lamps 40 to meet the fill light requirements, thereby saving the number of first fill light lamps 40 and saving the cost.

The first housing 10 may be assembled from at least two parts in the left-right direction, at least two parts in the up-down direction, or at least two parts in the front-rear direction. The various parts can be connected by connecting members, for example, by screws. Preferably, as shown in FIGS. 1 to 3, the first housing 10 includes a rear housing 11 and a first cover 12, and the first cover 12 is connected with the rear housing 11 in a snap-connection manner. The first housing 10 includes a rear housing 11 and a first cover 12, and the first housing 12 is connected with the rear housing 11 in a snap-connection manner, so as to facilitate the installation of the stitching lens mechanism and part of the driving assemblies to the first housing 10. In addition, it is convenient to replace or repair the stitching lens mechanism and driving assemblies. The first housing 10 includes two parts, a rear housing 11 and a first cover 12, and they are easy to assemble. The left and right sides of the rear housing 11 are used to mount a rotating shaft of a rotating assembly. The first housing 10 composed of the rear housing 11 and the first cover 12 on the front side is easier to ensure that the rotating shaft mounting hole on the rear housing 11 has a higher coaxiality than the first housing 10 composed of left and right parts.

Since the first lens 51 is arranged in the first housing 10, a window needs to be provided on the first housing 10 opposite to the first lens 51, so as not to hinder the first lens 51 from taking pictures for an imaging scene. On the premise that the number of first lenses 51 is two, preferably, two first windows 121 are provided on the first cover 12 in the embodiment of the present application. As shown in FIG. 3, the first windows 121 are all rectangular in structure, two first windows 121 are arranged at intervals, a first transparent piece 30 is mounted on the first window 121, and the transparent cover 30 is opposite to the first lens 51. Corresponding to the structure of the first window 121, the first transparent piece 30 is also a rectangular cover. The first transparent cover 30 is used to protect the first lens 51 and also to prevent external dust from entering the first housing 10 that will reduce the service life of the camera.

Preferably, the first cover 12 has two symmetrical mounting bevel 123, and the distance between each mounting bevel 123 and a rear end face of the rear housing 11 from the inside to the outside is gradually reduced. Since the number of the first lenses 51 and the first fill light lamps 40 are both two, a first window 121 and a first fill light lamp 40 are provided on each mounting bevel 123. The first window 121 is opposite to the first lens 51. Since there is an included angle between the two first lenses 51 and there is also an included angle between the two first fill light lamps 40, arranging the first window 121 on the mounting bevel 123 can be more easily to be opposite to the first lens 51, arranging the first fill light lamp 40 on the mounting bevel 123 can more easily to fully fill light for the imaging field of view.

On the premise that the number of the first fill light lamps 40 is two, as shown in FIG. 3, preferably, the two mounting bevels 123 of the first cover 12 are respectively provided with a lamp body mounting port 122, and the two lamp body mounting ports 122 are circular ports in structure. The two lamp body mounting ports 122 are located between the two first windows 121, and the first fill light lamps 40 are connected to the lamp body mounting ports 122 in a snap-connection manner. Two lamp body mounting ports 122 are provided on the first cover 12, and the first fill light lamps 40 are connected to the lamp body mounting ports 122 in a snap-connection manner, and the installation of the first fill light lamps 40 are convenient and fast. Since the first housing 10 includes a rear housing 11 and a first housing 12, the first cover 12 is connected with the rear housing 11 in a snap-connection manner, so that it is convenient to install the first fill light lamps 40 on the lamp body mounting ports 122, and it is also convenient to disassemble the first fill light lamps 40 from the light body mounting ports 122, so as to facilitate the replacement or maintenance of the first fill light lamps 40. The two first windows 121 and the two lamp body mounting ports 122 are distributed in the first plane.

The above-mentioned camera may include a mounting bracket, the first housing 10 may be mounted on the mounting bracket, and the first housing 10 is rotatably mounted on the mounting bracket, and the first housing 10 can rotate around the mounting bracket in the second plane under the drive of the driving assembly. The driving assembly may be an electric motor 70. That is, the camera in this application may only include a one camera mechanism, i.e. stitching lens mechanism. Preferably, as shown in FIG. 1, in order to improve the function of the camera of the embodiment of the present application, another camera mechanism is added to the camera of the embodiment of the present application, and the camera mechanism is a second lens assembly. Specifically, the camera further includes a second housing 20, a second lens assembly is mounted in the second housing 20, and the second lens assembly includes a second lens. The second lens and the first lens 51 face the same side. The second lens is a fixed focus lens, and the first lenses 51 are zoom lenses. The first lens is a fixed focus lens, the first lens is used for global monitoring, the first lenses 51 are zoom lenses, and the first lens 51 can partially enlarge a captured image and has the function of face recognition. A second transparent piece 21 opposite to the second lens is provided on the front side of the second housing 20, and a second fill light lamp 22 is provided on each of the left and right sides of the second transparent piece 21, respectively.

On the basis that the camera of the embodiment of the present application includes a second housing 20 and a second lens assembly mounted in the second housing 20, as shown in FIG. 1, in order to save occupation space of the entire camera, one end of the second housing 20 where the second lens is mounted is a mounting end, the mounting end of the second housing 20 is also provided with a mounting space 24, and the shape of the side of the mounting space 24 is an L-shaped structure. The first housing 10 is mounted on the mounting space 24. A mounting space 24 is provided at the mounting end of the second housing 20, the mounting space 24 is used to mount the first housing 10, which not only facilitates the first lens 51 to face the same side, but also reduces the occupation space of the entire camera.

As shown in FIG. 1, in order to facilitate the installation of the first housing 10, two symmetrical mounting blocks 23 are provided on the second housing 20, one of the mounting blocks 23 extends downward from the left side of the second housing 20 to the mounting space 24, and the other of the mounting blocks 23 extends downward from the right side of the second housing 20 to the mounting space 24. The first housing 10 is arranged between the two mounting blocks 23 and is rotatably connected to the mounting block 23 through a rotating shaft 60. The driving assembly is preferably an electric motor 70, which is installed in the rear housing 11, and the rear housing 11 is also provided with a cover plate 111, the cover plate 111 is used for shielding the electric motor 70, and the electric motor 70 can also facilitate the installation of the electric motor 70. The first housing 10 can rotate around the rotating shaft 60 in the second plane under the drive of the electric motor 70. The second housing 20 is provided with two symmetrical mounting blocks 23, and the first housing 10 is rotatably mounted between the two mounting blocks 23, so that the installation of the first housing 10 is not only stable and reliable, but also can rotate around the mounting block 23 under the drive of the electric motor 70, thereby driving the stitching lens mechanism to rotate, so as to realize monitoring in a large imaging field of view.

Figure 7:
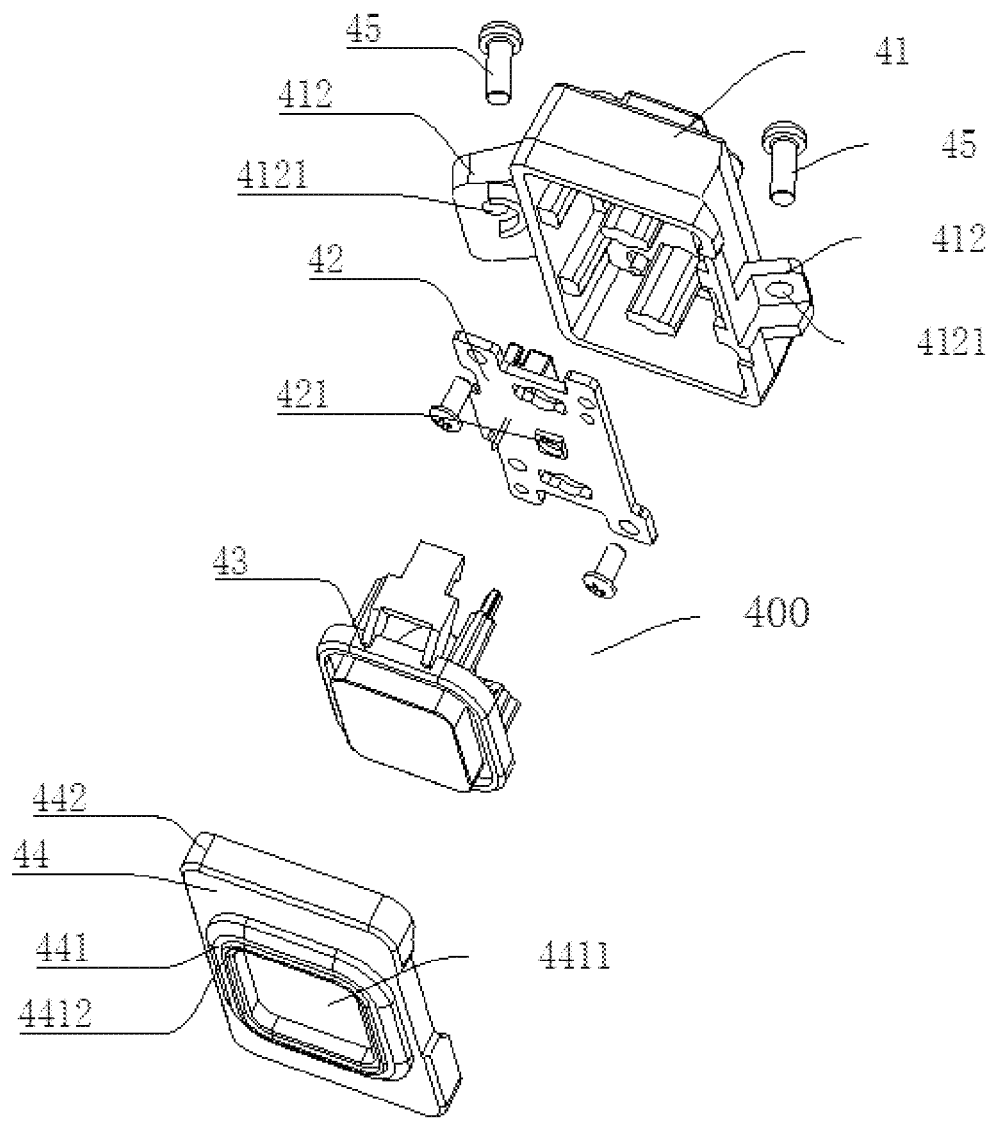
FIG. 7 is an exploded view of a fill light lamp module according to an embodiment of the present application.
Figure 8:
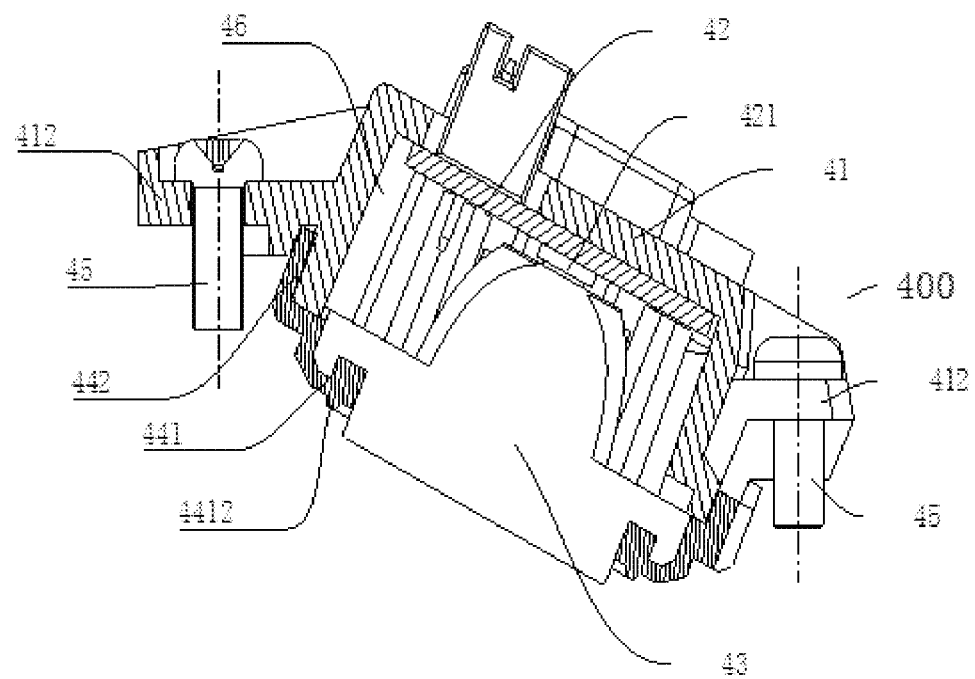
FIG. 8 is a sectional view of a fill light lamp module according to an embodiment of the present application.
Figure 9:
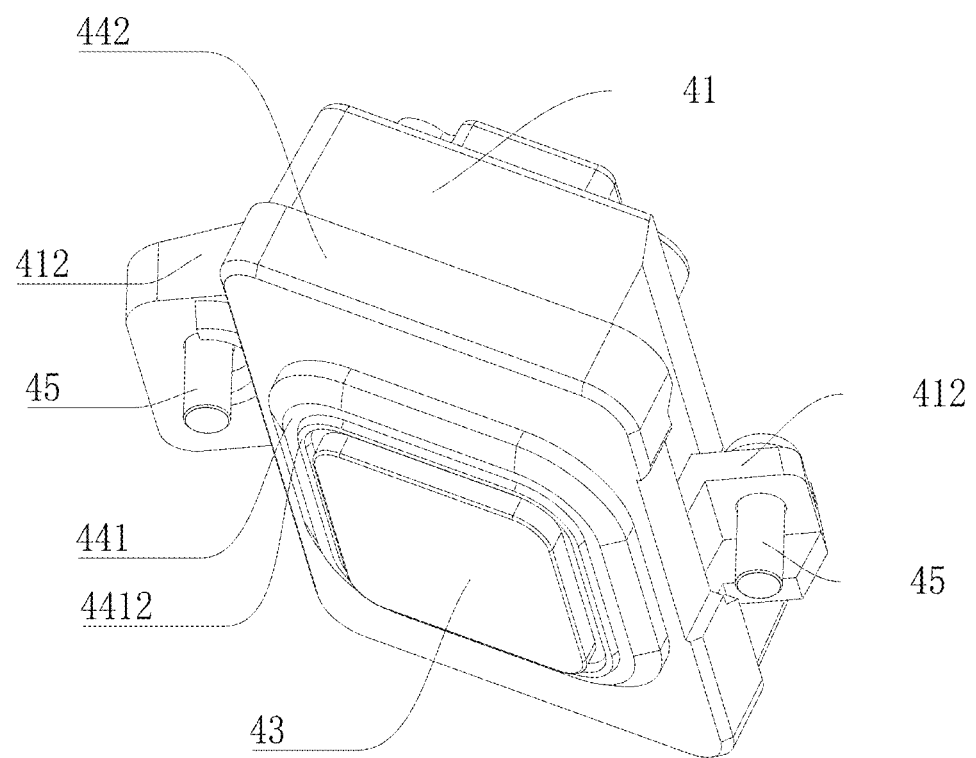
FIG. 9 is a perspective view of a fill light lamp module according to an embodiment of the present application.

As shown in FIGS. 7-9, the embodiment of the present application discloses a fill light lamp module 400, which includes a lamp body assembly and a sealing body 44, the lamp body assembly includes a housing enclosure and a lamp body 421, the sealing body 44 includes a sealing portion 441 and a connecting portion 442 that are interconnected, and the sealing portion 441 is provided with a through hole 4411. The connecting portion 442 is connected to the enclosure 41, and the sealing body 44 and the enclosure 41 enclose a lamp cavity 46. The lamp body 421 is disposed in the lamp cavity 46, and the lamp body 421 faces the through hole 4411. The sealing portion 441 is used to abut with the peripheral wall of the lamp port of the camera. The fill light lamp module 400 is used to be arranged in the mounting cavity of the camera, the surface surrounding the mounting cavity of the camera is the inner wall of the camera, and the peripheral wall of the lamp port refers to the inner wall around the lamp port.

The advantage of the fill light lamp module 400 of the embodiment of the present application is that after the fill light lamp module 400 is mounted in the mounting cavity of the camera, the sealing portion 441 can be sandwiched between the peripheral wall of the lamp port of the camera and the lamp body assembly to seal the camera, and the sealing body 44 can be combined with the enclosure 41 of the lamp body assembly to prevent the light of the lamp body assembly from entering a lens and an image sensor. Therefore, the sealing body 44 of the embodiment of the present application can seal the camera and block light from the lamp body assembly at the same time. Compared with the existing installation of waterproof assemblies to seal the camera and the installation of anti light leakage assemblies to block light from the lamp body assembly, the fill light lamp module 400 of the embodiment of the application can improve the convenience of assembling of the camera.

In addition, since one part of the sealing body 44 can achieve the effects of waterproofing and anti light leakage, and the sealing body 44 has a simple structure and a small occupation space, so the fill light lamp module 400 has a small occupation space and is also beneficial to the miniaturization of the camera.

The lamp body assembly further includes a lamp plate 42 which may be an aluminum substrate, and the lamp plate 42 may have a rectangular plate structure. The lamp body 421 is arranged on a surface of the lamp plate 42 facing a through hole 4411, the enclosure 41 has a mounting cavity, and the lamp plate 42 is arranged in a mounting cavity of the housing 41, and the lamp plate 42 can be fixed in the mounting cavity of the enclosure 41 by screws.

A light distribution element 43 is further provided in the lamp cavity 46, and the light distribution element 43 is provided between the lamp body 421 and the through hole 4411, the through hole 4411 may be a rectangular hole with a rectangular end face. The light distribution element 43 may be a lens. One end of the light distribution element 43 facing away from the lamp body 421 passes through the through hole 4411 and extends out of the lamp cavity 46, the light distribution element 43 blocks the through hole 4411, so that the lamp cavity 46 forms a sealed cavity, and the lamp cavity 46 has the effect of waterproof and can better prevent the light of the lamp body of the lamp body assembly from leaking into the mounting cavity of the camera.

The sealing body 44 is an integrally formed member, which is easy to manufacture, is beneficial to reduce the cost, and is relatively convenient to install and disassemble. The sealing body 44 is an elastic member, that is, the sealing portion 441 and the connecting portion 442 are both elastic members, and both have elasticity. The sealing body 44 may be made of rubber. The connecting portion 442 and the sealing portion 441 may be arranged vertically, the connecting portion 442 is connected to the edge of the sealing portion 441, and the connecting portion 442 faces the enclosure 41, and the connecting portion 442 and the sealing portion 441 enclose a cavity. The connecting portion 442 is sleeved on the outer surface of an open end of the enclosure 41, and the connecting portion 442 is in sealing connection with the outer surface of the open end of the enclosure 41.

The enclosure 41 includes a first connecting portion 412, which is used for connecting with the housing of the camera, and the connection is convenient. After the first connecting portion 412 is connected to the housing of the camera, the sealing portion 441 is sandwiched between the peripheral wall of the lamp port of the camera and the enclosure 41, that is, the sealing portion 441 is sandwiched between the peripheral wall of the lamp port of the camera and the lamp body assembly.

The first connecting portion 412 is provided on the outer side of the enclosure 41, and the first connecting portion 412 is provided with a first connecting hole 4121, and the first connecting hole 4121 can be connected to the housing of the camera through the first connecting member 45. The number of the first connecting portions 412 may be two, and the two first connecting portions 412 are respectively provided on two opposite outer sides of the enclosure 41.

The surface of the sealing portion 441 facing away from the enclosure 41 is provided with a protrusion 4412, the protrusion 4412 may be a ring-shaped structure, and the protrusion 4412 is used to press-fit with the inner peripheral wall of the first lamp port 120, so as to improve the sealing effect of the sealing part 441 on the camera.

In another embodiment, the sealing body 44 is a stitching member, and the sealing portion 441 and the connecting portion 442 are formed separately and then connected together. The materials of the sealing portion 441 and the connecting portion 442 may be different, for example, the connecting portion 442 may be made of a hard material. At this time, the connecting portion 442 may be sleeved by and fitted with the inner surface of the open end of the enclosure 41 or may sleeve and be fitted with the outer surface of the open end of the enclosure 41.

As shown in FIGS. 10-20, the embodiment of the present application discloses another camera, which includes a first housing 10, a first lens assembly 300, and a fill light lamp module 400 of the above-mentioned embodiment, the first housing 10 has a first mounting cavity 110, and the first housing 10 is provided with a first lamp port 120. The first lens assembly 300 and the fill light lamp module 400 are arranged in the first mounting cavity 110, the sealing portion 441 is sandwiched between the peripheral wall of the first lamp port 120 and the lamp body assembly, and the through hole 4411 is arranged opposite to the first lamp port 120.

The advantage of the camera of the embodiment of the present application is that the sealing portion 441 is sandwiched between the peripheral wall of the first lamp port 120 of the camera and the lamp body assembly to seal the camera, and the sealing body 44 can be combined with the enclosure 41 of the lamp body assembly to prevent the light of the lamp body assembly from entering a lens and an image sensor. Therefore, the sealing body 44 of the embodiment of the present application can seal the camera and block light from the lamp body assembly at the same time. Compared with the existing installation of waterproof assemblies to seal the camera and the installation of anti light leakage assemblies to block light from the lamp body assembly, the fill light lamp module 400 of the embodiment of the application can improve the assembly convenience of the camera.

In addition, since one part of the sealing body 44 can achieve the effects of waterproofing and anti light leakage, and the sealing body 44 has a simple structure and a small occupation space, so the fill light lamp module 400 has a small occupation space and is also beneficial to the miniaturization of the camera.

The protrusion 4412 is press-fitted with the inner peripheral wall of the first lamp port 120, so that the sealing effect of the sealing portion 441 on the camera can be improved. The protrusion 4412 may be a ring-shaped structure.

The enclosure 41 includes a first connecting portion 412, the first housing 10 includes a second connecting portion 14, the first connecting portion 412 and the second connecting portion 14 are connected by a first connecting member 45, the first connecting portion 412 is arranged in parallel with the second connection portion 14, which is convenient for the first connecting portion 45 to connect the first connecting portion 412 and the second connecting portion 14, and also beneficial to improve the connection reliability of the first connecting portion 412 and the second connecting portion 14. The first connecting member 45 may be a screw. The second connecting portion 14 is a protrusion provided on an inner wall around the first lamp port 120, or the second connecting portion 14 is the inner wall around the first lamp port 120.

Figure 12:
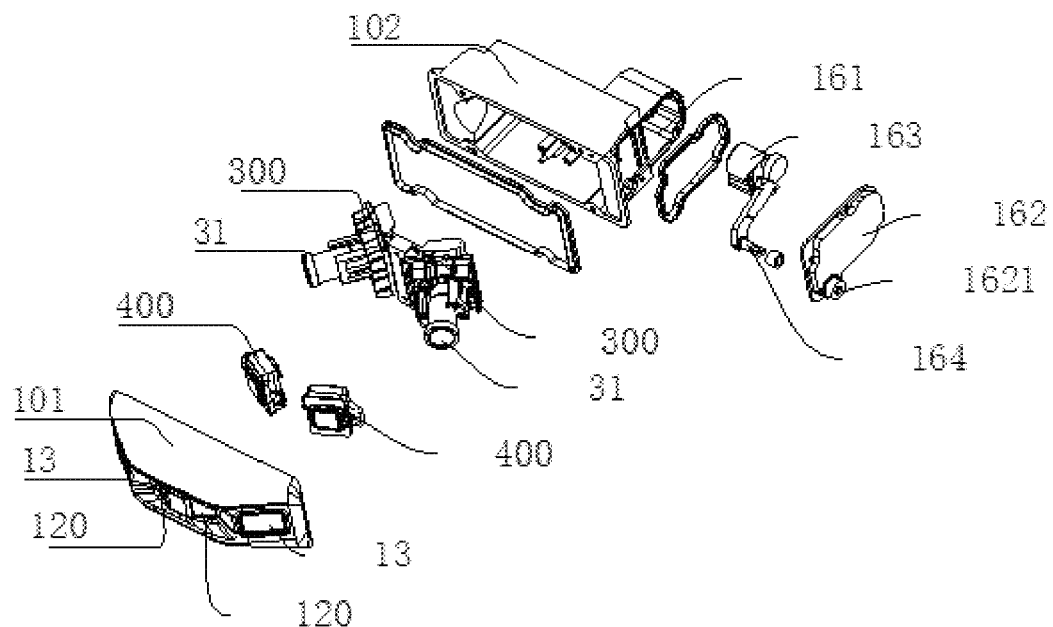
FIG. 12 is an exploded view of a first lens assembly according to another embodiment of the present application.
Figure 13:
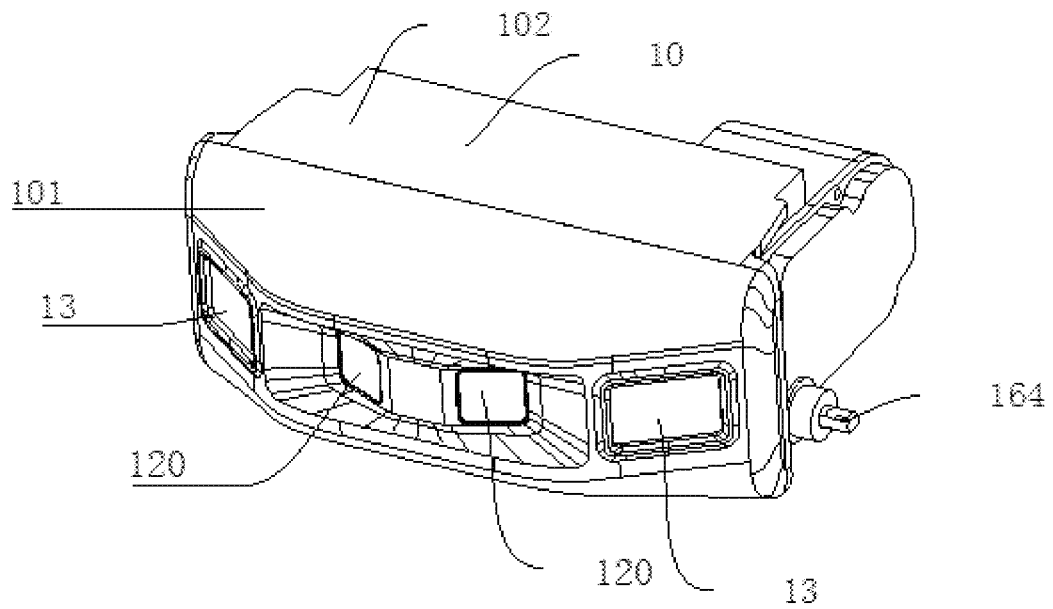
FIG. 13 is a perspective view of a first lens assembly according to another embodiment of the present application.
Figure 14:
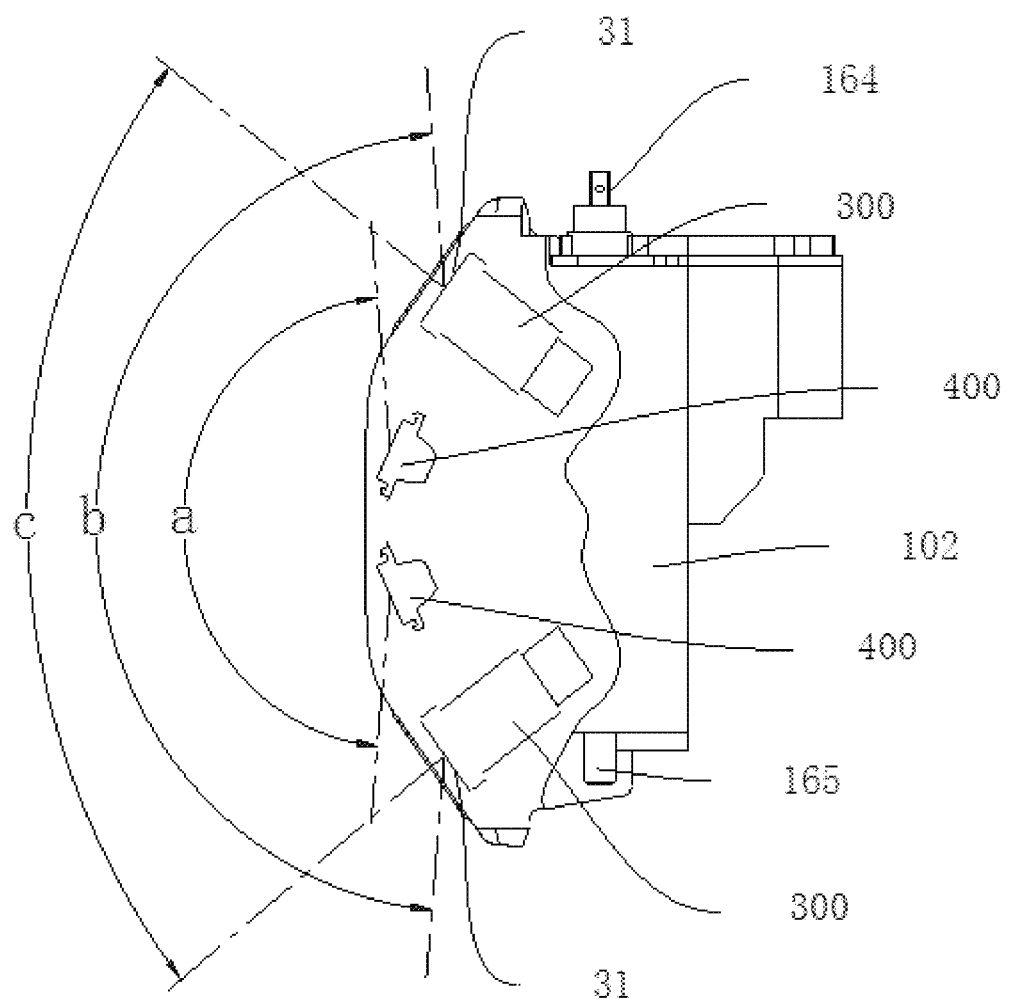
FIG. 14 is a diagram of distribution of a first lens and a fill light lamp module according to another embodiment of the present application.
Figure 15:
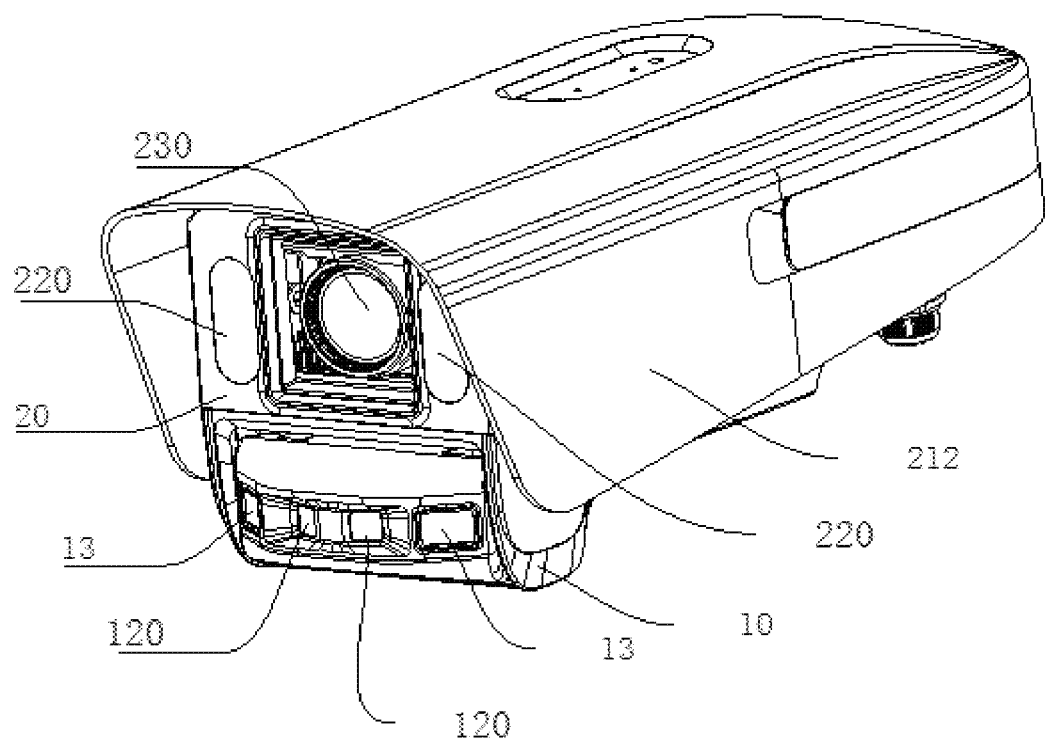
FIG. 15 is a perspective view of a camera according to another embodiment of the present application.

As shown in FIGS. 12-14, the first lens assembly 300 is a stitching lens assembly, and the stitching lens assembly has a larger angle of view compared to the non stitching lens assembly. The first lens assembly 300 includes at least two first lenses 31, as shown in FIG. 14, an included angle c is formed between axes of two adjacent first lenses 31, and the included angle c ranges from 50° to 90°, at this time, a combined viewing angle of view of the two first lenses 31 can be larger. Preferably, the included angle c ranges from 70° to 80°, for example, the included angle c may be 76°. The first lens 31 is preferably a fixed focus lens, and the first lens 31 is used for global monitoring. The at least two first lenses 31 are fixed focus lenses with high consistency, and the position accuracy between the at least two first lenses 31 is required to be high, and the at least two first lenses are integrally assembled.

The combined viewing angle formed by two adjacent first lenses 31 is a viewing angle b, which ranges from 150° to 190°, and a sufficiently large combined viewing angle can be beneficial to obtain a wide range of images. The angle of a viewing angle b may be designed by designing the angle of the included angle c. Angles of field of view of the two first lenses 31 have portions overlapping each other, the combined viewing angle is not the superposition of the angle of view of each first lens 31, and the combined viewing angle refers to the angle of view that the two first lenses 31 can achieve.

The first lens assembly 300 of the embodiment of the present application can rotate with the first housing 10, thereby having a larger angle of view. The number of the first lenses 31 of the first lens assembly 300 is preferably two, which can save costs while meeting the requirement of the angle of view.

As shown in FIG. 16, the enclosure 01 of the existing camera is provided with two windows 02 and two fill light lamp ports 03, and the horizontal plane of the distribution of the two windows 02 is different from the horizontal plane of the two fill light lamp ports 03, the horizontal plane of the distribution of the two lenses is different from the horizontal plane of the distribution of the two fill light lamps, so that occupation space of the existing camera is large.

Figure 10:
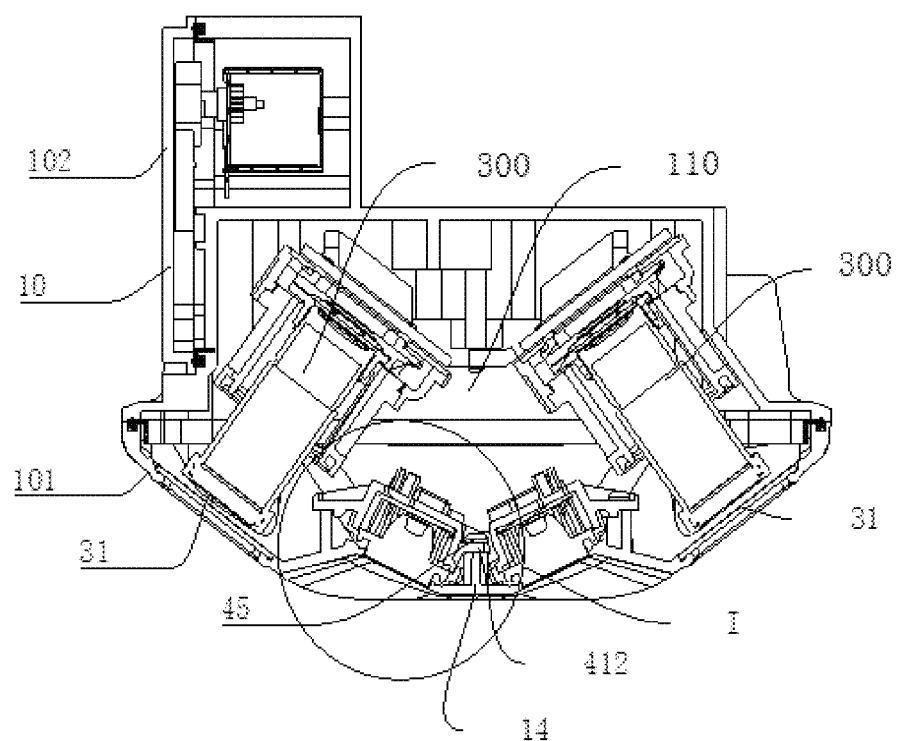
FIG. 10 is a sectional view of a first lens assembly according to another embodiment of the present application.
Figure 11:
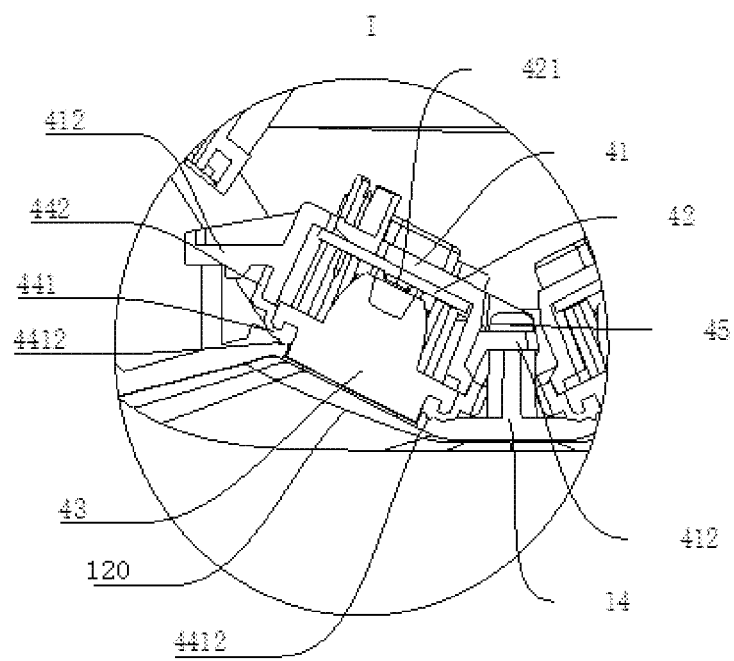
FIG. 11 is a partial enlarged view of FIG. 10 at I.

As shown in FIG. 10, the fill light lamp module 400 is arranged between two adjacent first lenses 31, and the optical axis of the fill light lamp module 400 and the axis of the first lens 31 are distributed on the same plane. Therefore, it is beneficial to reduce the size of the first housing 10, in combination with FIG. 10 and FIG. 11, the first housing 10 of the embodiment of the present application is more flat. When the camera of the embodiment of the present application is in use, the two first lenses 31 are distributed on a horizontal plane, so the stitching lens assembly increases the horizontal angle of view.

The number of fill light lamp modules 400 is at least two, an angle is formed between two adjacent fill light lamp modules 400, and the combined fill light angle of the two adjacent fill light lamp modules 400 is the fill light angle a. The total fill light angle of all fill light lamp modules 400 needs to cover the total angle of view of all the first lenses 31, so that all the fill light lamp modules 400 can fully fill light for the first lens assembly 300.

As shown in FIG. 14, when the number of the first lenses 31 and the number of the fill light lamp modules 400 are both two, the fill light angle a is the total fill light angle of all the fill light lamp modules 400, and the angle of view b is the total angle of view of all the first lenses 31, and the fill light angle a is greater than or equal to the angle of view b.

The camera further includes a second housing 20, and the first housing 10 is rotatably connected to the second housing 20. The first housing 10 can rotate, which can further increase the range of the total angle of view of the first lens assembly 300. The first lens 31 is used for global monitoring. The range of the total field of view of the first lens assembly 300 in the embodiment of the present application is large, that is, the range of global monitoring is large.

Specifically, the camera further includes an outer cover 212, the outer cover 212 is connected to the second housing 20, and the outer cover 212 is covered on the second housing 20, and the outer cover 212 plays a role of decoration. The second housing 20 has a second mounting cavity, the camera further includes a second lens assembly, and the second lens assembly is arranged in the second mounting cavity.

Figure 18:
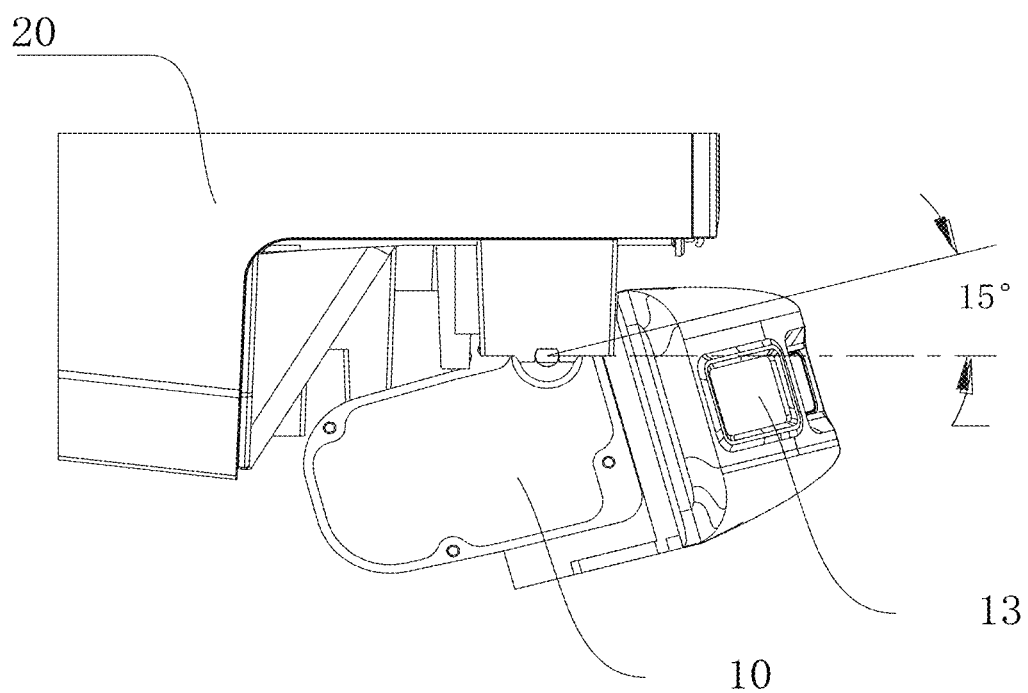
FIG. 18 is a diagram of a first housing in a first rotation direction according to another embodiment of the application.
Figure 19:
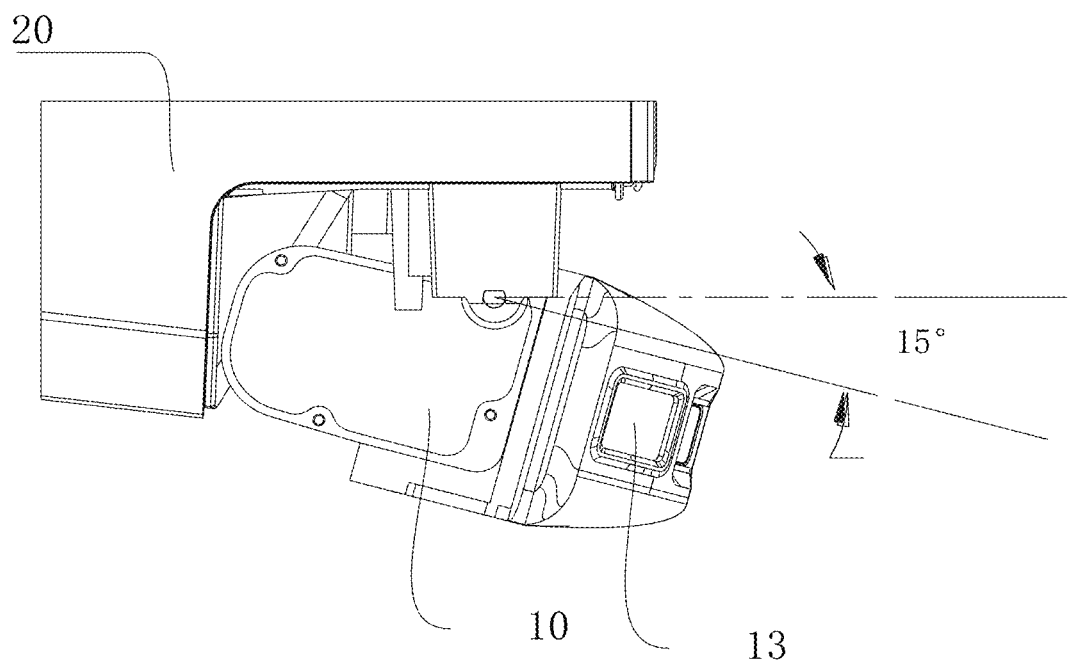
FIG. 19 is a diagram of a first housing in a second rotation direction according to another embodiment of the application.

As shown in FIGS. 18 and 19, there is an included angle between the distribution plane of the first lenses 31 and the rotation plane of the first housing 10, which is beneficial to increase the imaging range of the camera of the embodiment of the present application. Preferably, the distribution plane of the first lenses 31 is perpendicular to the rotation plane of the first housing 10. During the use of the camera of the embodiment of the present application, the first lenses 31 are distributed on a horizontal plane, and the first housing 10 rotates on a vertical plane. The first housing 10 adjusts a vertical angle of view.

The fill light lamp module 400 of the embodiment of the present application is arranged between two adjacent first lenses 31, and the optical axis of the fill light lamp module 400 and the axis of the first lenses 31 are distributed on the same plane. This is beneficial to reduce the size of the first housing 10 and make the first housing 10 more flat. In addition, since the first housing 10 can rotate, the occupation space of the camera of the embodiment of the present application is further reduced under the same angle of view, and weight of the camera in the embodiment of the present application is also lighter.

The second housing 20 is provided with a second lamp port 220 and a second window 230, and the second lamp port 220 is mounted with a second fill light lamp. The second lens assembly includes a second lens, and the second lens is arranged opposite to the second window 230. The second fill light lamp is used to fill light for the second lens. The second lens is preferably a zoom lens, and the second lens can be partially enlarged for detail monitoring.

The camera of the embodiment of the present application is a binocular camera including a first lens assembly 300 and a second lens assembly. The camera in the embodiment of the present application can monitor globally, and the range of global monitoring is large, as well as detailed monitoring.

Figure 17:
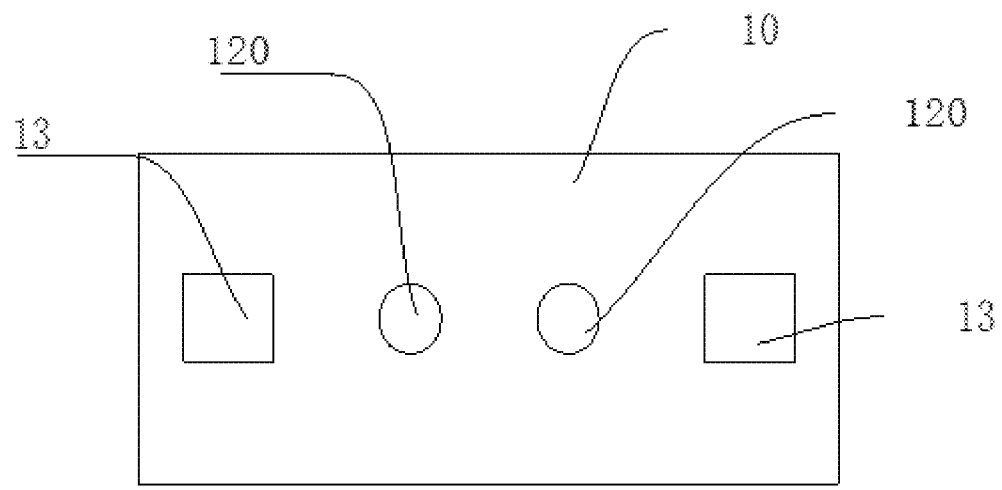
FIG. 17 is an end view of a first housing according to another embodiment of the present application.
Figure 20:
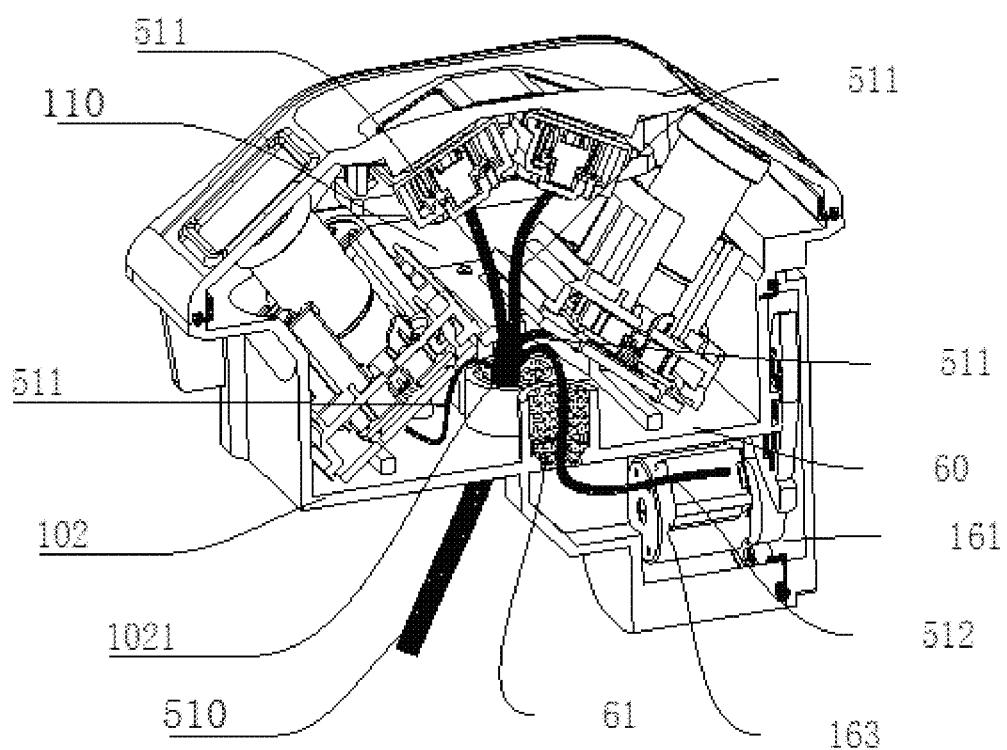
FIG. 20 is a diagram of an internal structure of a first housing according to another embodiment of the present application.

As shown in FIGS. 17 and 20, the first housing 10 includes a front housing 101 and a rear housing 102, and the front housing 101 and the rear housing 102 may be made of metallic materials. The front housing 101 is in sealing connection with the rear housing 102, and the front housing 101 and the rear housing 102 enclose a first mounting cavity 110. Specifically, the front housing 101 has a cavity, the fill light lamp module 400 is arranged in the cavity of the front housing 101, and the fill light lamp module 400 is mounted on the inner wall of the front housing 101. The first lamp port 120 and the first window 13 are both arranged on the front housing 101.

The first housing 10 is driven to rotate by a power device, the first housing 10 has a third mounting cavity, the power device is arranged in the third mounting cavity, the first mounting cavity 110 and the third mounting cavity are sealing cavities. The power device is preferably an electric motor.

Specifically, the rear housing 102 further has a motor cavity 161, and the motor cavity 161 is a third mounting cavity. The motor cavity 161 has an open end, and an end cover 162 is mounted at the open end of the motor cavity 161, the end cover 162 may be a transparent plastic, and working conditions of components in the motor cavity 161 may be observed. A motor 163 is fixedly arranged in the motor cavity 161, a motor shaft of the motor 163 is connected to a first rotating shaft 164, and the motor shaft and the first rotating shaft 164 may be transmitted through gears. The end cover 162 is provided with a through hole 1621, and the outer end of the first rotating shaft 164 passes through the through hole 1621 to extend out of the motor cavity 161. The outer end of the first rotating shaft 164 is fixedly connected to the second housing 20. The outer end of the first rotating shaft 164 is provided with a plane, the second housing 20 is provided with a limiting portion, and the plane of the outer end of the first rotating shaft 164 is limited by a limiting portion of the second housing 20 and cannot rotate.

An end face of the rear housing 102 opposite to the outer end of the first rotating shaft 164 is provided with a second rotating shaft 165, and the second rotating shaft 165 is coaxial with the first rotating shaft 164. The second rotating shaft 165 is rotatably connected to the second housing 20. When the motor 163 rotates, the first rotating shaft 164 does not rotate, the motor 163 drives the first housing 10 to rotate, the inner wall surrounding the through hole 1621 rotates relative to the first rotating shaft 164, and the second rotating shaft 165 rotates relative to the second housing 20. The rotation range of the first housing 10 is preferably 0 to 30°. As shown in FIGS. 18 and 19, taking the horizontal plane as a reference surface, the first housing 10 may rotate 15° up and down with respect to the reference surface. The advantage of the first housing 10 being able to rotate includes: when installing camera, the requirement on the orientation of the first lens 31 can be reduced, and adjustment of an installation angle of the entire camera can be avoided.

The motor cavity 161 and the first mounting cavity 110 in the embodiment of the present application are separate cavities, which may improve waterproof capability of the motor cavity 161 and the first mounting cavity 110 respectively. If the waterproof of the motor cavity 161 fails, the waterproof of the first mounting cavity 110 will not be affected, if the waterproof of the first mounting cavity 110 fails, the waterproof of the motor cavity 161 will not be affected. The first window 13 is provided with transparent glass, and the transparent glass is sealed with the front housing 101 by glue. The front housing 101 is in sealing connection with the rear housing 102 by a sealing ring. The end cover 162 is in sealing connection with the rear housing 102 by a sealing ring. The first mounting cavity 110 is provided with a desiccant to prevent the first lens 31 from fogging.

The rear housing 102 is provided with a first threading hole 1021, a cable 510 passes through the first threading hole 1021 into the first mounting cavity 110, and the cable 510 is divided into a first cable 5101 and a second cable 5102 in the first mounting cavity 110, the first cable 5101 is electrically connected to the first lens assembly 300 and the lamp body 421. A partition plate 60 between the motor cavity 161 and the first mounting cavity 110 is provided with a second threading hole 61, and a second cable 5102 passes through the second threading hole 61 and is electrically connected to the motor 163. The cable 510 and the first threading hole 1021 are sealed from each other by gluing. The second cable 5102 and the second threading hole 61 sealed from each other by gluing.

As shown in FIG. 13 and FIG. 14, the first housing 10 of the camera of the embodiment of the present application is provided with two first lenses 31 and two fill light lamp modules 400, and an included angle is formed between the axes of the two first lenses 31. The fill light lamp module 400 is arranged between the two first lenses 31, and an included angle is formed between optical axes of the two fill light lamp modules 400. The first housing 10 is provided with two first windows 13 and two first lamp ports 120, the first lens 31 faces the first window 13, and the lamp body 421 faces the first lamp port 120. The first window 13 and the first lamp port 120 are distributed on different planes. The camera in the embodiment of the present application saves more space than a camera in which the window and the lamp port are distributed on the same plane. The camera of the embodiment of the present application can monitor in a large range when the number of the first lenses 31 and the fill lamp modules 400 is small, and the fill light lamp module 400 can fully fill light for the first lens 31, and the size of the camera is small.

The first lamp port 120 is arranged in parallel with the opposing fill light lamp module 400, and the first window 13 is arranged in parallel with the opposing first lens 31. As shown in FIG. 7, an included angle is formed between the two first lamp ports 120, and an included angle is formed between the two first windows 13.

An embodiment of the present application provides a camera, including a first housing, two first lens assemblies, a second housing, a second lens assembly, and four fill light lamp assemblies;

the two first lens assemblies are mounted in the first housing, the first lens assembly includes a first lens, and the first housing is provided with two first windows and two first lamp ports, the first window is opposite to the first lens, the first lens is used to collect images through the first window, and centers of the first window and the first lamp port are set at a same vertical height;

the second lens assemblies are mounted in the second housing, the second lens assembly includes a second lens, and the second housing is provided with two second windows and two second lamp ports, the second lens is used to collect images through the second window, and centers of the second window and the second lamp port are set at a same vertical height;

the first housing and the second housing are detachably connected;

the four fill light lamp assemblies are respectively fixed to the two first lamp ports and the two second lamp ports, and are used to fill light to the first lens assembly and the second lens assembly;

wherein, the first housing is a component with a curved surface, including a first curved component and a second curved component; the first window is arranged on the first curved component, and the first lamp port is arranged on the second curved component, the first curved component and the second curved component are not coplanar.

Preferably, a first included angle is formed between axes of the two first lenses, and the first included angle ranges from 50° to 90°.

Preferably, there is an overlapping included angle between imaging fields of view of the two first lenses, the imaging fields of view of the two first lenses are combined into a total field of view, an included angle of the total field of view is a total included angle, the total included angle ranges from 150° to 190°, and the overlapping included angle is between 10% and 15% of the total included angle.

Preferably, the second lens and the first lenses face the same side; the second lens is a fixed focus lens, and the first lenses are zoom lenses.

Preferably, the camera further includes a driving assembly, which is connected to the first lens assembly through a rotating assembly;

the first housing has a first mounting cavity, the at least two first lens assemblies are mounted in the first mounting cavity, and the driving assembly is connected to the first housing through the rotating assembly.

Preferably, the second housing has a second mounting cavity, and the second lens assembly is mounted in the second mounting cavity.

Preferably, the two first lenses are distributed in a first plane, the first housing is rotatably arranged in a second plane, and the second plane is perpendicular to the first plane.

Preferably, one end of the second housing where the second lens assembly is mounted is a mounting end, and the mounting end of the second housing is also provided with a mounting space, and the first housing is mounted on the mounting space.

Preferably, two symmetrical mounting blocks are arranged on the second housing, and the first housing is arranged between the two mounting blocks and is rotatably connected to the mounting blocks through a rotating shaft.

Preferably, the first housing is driven to rotate by a power device, the first housing has a third mounting cavity, the power device is arranged in the third mounting cavity.

Preferably, the fill light lamp assembly includes a lamp body assembly and a sealing body; the lamp body assembly includes an enclosure and a lamp body, the sealing body is provided with a through hole; the sealing body is connected to the enclosure, and the sealing body and the enclosure enclose a lamp cavity; the lamp body is arranged in the lamp cavity, and the lamp body faces the through hole; the sealing body is used for abutting against an inner peripheral wall of a lamp port of the camera.

Preferably, the sealing body is an integrally formed member.

Preferably, the sealing body is an elastic member.

Preferably, the sealing body is sleeved by and fitted with the enclosure.

Preferably, a light distribution element is provided between the lamp body and the through hole, and the light distribution element blocks the through hole.

Preferably, a sealing body of the fill light lamp assembly is sandwiched between an inner peripheral wall of the first lamp port and a lamp body assembly of the fill light lamp assembly, and a through hole of the fill light lamp assembly is arranged opposite to the first lamp port;

a sealing body of the fill light lamp assembly is sandwiched between an inner peripheral wall of the second lamp port and a lamp body assembly of the fill light lamp assembly, and a through hole of the fill light lamp assembly is arranged opposite to the second lamp port.

Preferably, the sealing body of the fill light lamp assembly is provided with a protrusion that is press-fitted with the inner peripheral wall of the first lamp port;

the sealing body of the fill light lamp assembly is provided with a protrusion that is press-fitted with the inner peripheral wall of the second lamp port.

Preferably, an enclosure of the fill light lamp assembly includes a first connecting portion, the first housing includes a second connecting portion, the first connecting portion is connected to the second connecting portion by a connecting piece, the first connecting portion and the second connecting portion are arranged in parallel.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A camera, comprising:
    a first housing and a second housing, wherein the first housing has a first mounting cavity, and the first housing is provided with a first lamp port, the first housing is rotatably connected to the second housing;
    a first lens assembly and a fill light lamp assembly, which are arranged in the first mounting cavity;
    wherein the first lens assembly comprises at least two first lenses, and an included angle formed between axes of two adjacent first lenses ranges from 50° to 90°, wherein the fill light lamp assembly is arranged between the two adjacent first lenses;
    wherein the fill light lamp assembly comprises a lamp body assembly and a sealing body; the lamp body assembly comprises an enclosure and a lamp body, the sealing body is provided with a through hole; the sealing body is connected to the enclosure, and the sealing body and the enclosure enclose a lamp cavity; the lamp body is arranged in the lamp cavity, and the lamp body faces the through hole; the sealing body is used for abutting against an inner peripheral wall of a lamp port of the camera;

wherein a part of the sealing body is sandwiched between an inner peripheral wall of the first lamp port and the lamp body assembly, and the through hole is arranged opposite to the first lamp port.

2. The camera of claim 1, wherein the sealing body is provided with a protrusion, and the protrusion is press-fitted with the inner peripheral wall of the first lamp port.

3. The camera of claim 1, wherein the enclosure comprises a first connecting portion, the first housing comprises a second connecting portion, the first connecting portion is connected to the second connecting portion by a connecting piece, the first connecting portion and the second connecting portion are arranged in parallel.

4. The camera of claim 1, wherein a combined viewing angle of the two adjacent first lenses ranges from 150° to 190°.

5. The camera of claim 4, wherein the number of the fill light lamp assembly is at least two, and an angle is formed between two adjacent fill light lamp assemblies, and an optical axis of the fill light lamp assembly and axes of the first lenses are distributed on a same plane.

6. The camera of claim 5, wherein there is an included angle between a distribution plane of the first lenses and a rotation plane of the first housing.

7. The camera of claim 5, wherein the camera further comprises a second lens assembly, the second housing has a second mounting cavity, and the second lens assembly is arranged in the second mounting cavity.

8. The camera of claim 5, wherein the first housing is driven to rotate by a power device, the first housing has a third mounting cavity, the power device is arranged in the third mounting cavity, the first mounting cavity and the third mounting cavity are sealed cavities.

9. A camera, comprising:
a first housing and a second housing, wherein the first housing is rotatably connected to the second housing;
a first lens assembly provided in the first housing; and
two fill light lamp assemblies provided in the first housing; wherein each of the fill light lamp assemblies comprises a lamp body assembly and a sealing body; the lamp body assembly comprises an enclosure and a lamp body, the sealing body is provided with a through hole; the sealing body is connected to the enclosure, and the sealing body and the enclosure enclose a lamp cavity; the lamp body is arranged in the lamp cavity, and the lamp body faces the through hole; the sealing body is used for abutting against an inner peripheral wall of a lamp port of the camera;
wherein the first lens assembly comprises two first lenses, an included angle is formed between the axes of the two first lenses;
wherein the fill light lamp assemblies are arranged between the two first lenses, an included angle is formed between optical axes of the two fill light lamp assemblies, and ranges from 50° to 90°;
the first housing is provided with two first windows and two first lamp ports, the first lenses face the first windows, and the lamp bodies face the first lamp ports;
the first windows and the first lamp ports are distributed on different planes.

\* \* \* \* \*